(12) United States Patent
Loebig (10) Patent No.: US 7,324,557 B2
(45) Date of Patent: Jan. 29, 2008

(54) METHOD, SWITCHING DEVICES AND REMOTE CONNECTION UNIT FOR TRANSMITTING DATA HAVING A REDUCED BANDWIDTH

(75) Inventor: Norbert Loebig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 923 days.

(21) Appl. No.: 10/149,228

(22) PCT Filed: Dec. 6, 2000

(86) PCT No.: PCT/EP00/12367

§ 371 (c)(1),
(2), (4) Date: Sep. 30, 2002

(87) PCT Pub. No.: WO01/43455

PCT Pub. Date: Jun. 14, 2001

(65) Prior Publication Data

US 2003/0108180 A1 Jun. 12, 2003

(30) Foreign Application Priority Data

Dec. 10, 1999 (DE) ................................. 199 59 717

(51) Int. Cl.
*H04J 3/18* (2006.01)
(52) U.S. Cl. ........................ 370/477; 370/521; 375/240

(58) Field of Classification Search ................ 370/236, 370/477–521; 725/240
See application file for complete search history.

(56) References Cited

U.S. PATENT DOCUMENTS

| 4,890,282 | A | * | 12/1989 | Lambert et al. | ............ 370/254 |
| 5,282,208 | A | * | 1/1994 | Takayama et al. | .......... 370/477 |
| 5,420,854 | A | * | 5/1995 | Hiraiwa | ...................... 370/359 |
| 5,499,240 | A | * | 3/1996 | Gittins et al. | ................ 370/468 |
| 5,594,727 | A | | 1/1997 | Kolbenson et al. | |
| 6,064,653 | A | * | 5/2000 | Farris | .......................... 370/237 |
| 6,249,531 | B1 | * | 6/2001 | Jacobi et al. | ................ 370/477 |
| 6,353,666 | B1 | * | 3/2002 | Henderson et al. | ......... 379/229 |
| 6,434,168 | B1 | * | 8/2002 | Kari | ........................... 370/521 |

FOREIGN PATENT DOCUMENTS

| WO | WO 96/18272 | 6/1996 |
| WO | WO 99/60738 | 11/1999 |

* cited by examiner

*Primary Examiner*—Ajit Patel
(74) *Attorney, Agent, or Firm*—Bell, Boyd & Lloyd (57) ABSTRACT

The invention relates to a method for transmitting data having a reduced bandwidth wherein the amount of data intended for transfer over a data transfer network is reduced by a reduction method, wherein the type of reduction performed is signaled by a source switching device to a terminal switching device in the data transfer network, such that in the terminal switching device, transferred data is processed using a partner method to the reduction method in order to recover the original data.

9 Claims, 6 Drawing Sheets

Fig.1

PRIOR ART

METHOD, SWITCHING DEVICES AND REMOTE CONNECTION UNIT FOR TRANSMITTING DATA HAVING A REDUCED BANDWIDTH

CLAIM FOR PRIORITY

This application claims priority to International Application No. PCT/EP01/12367 which was published in the English language on Jun. 14, 2002.

TECHNICAL FIELD OF THE INVENTION

The invention relates to a method for transmitting data with a reduced bandwidth in which the quantity of the data to be transmitted over a data transmission network is reduced by a reduction method.

BACKGROUND OF THE INVENTION

The data is transmitted in data packets or in transmission channels with a fixed bandwidth in the data transmission network. The data packets are usually of a permanently predefined size. Information relating to the destination is specified in a packet header. The user information data to be transmitted is located in a packet body.

During the transmission in transmission channels, in the simplest case a line is used for each user information connection. However, a plurality of user information connections are usually transmitted over one transmission link, fixed time windows being predefined in one time frame for the transmission of the user information data of a user information channel.

Figure 1:
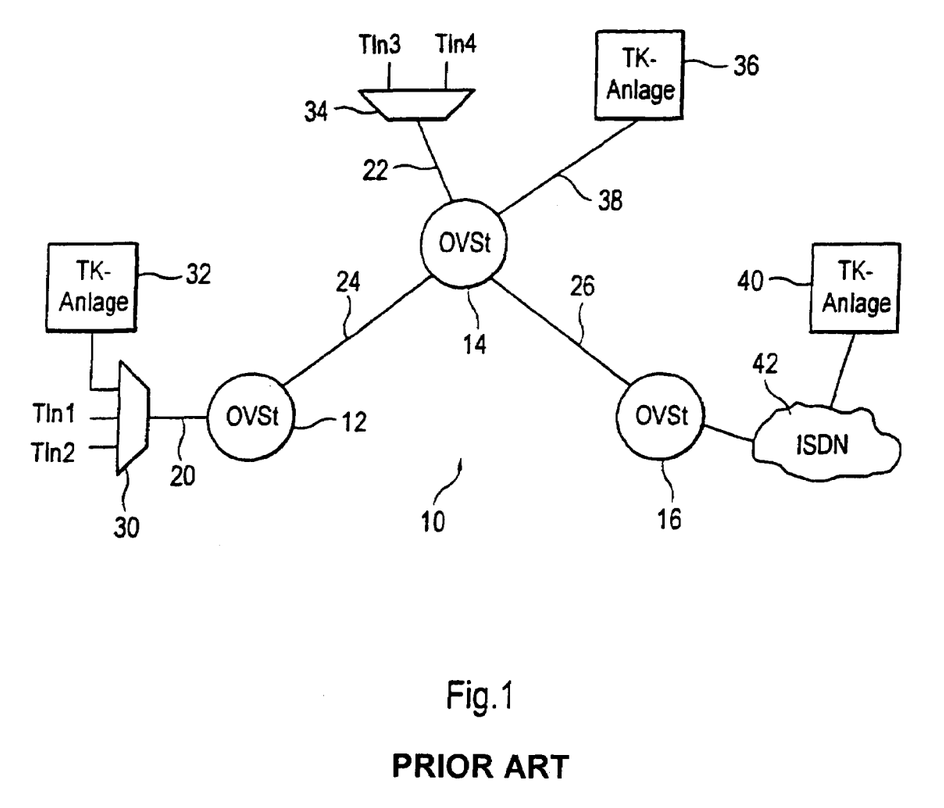
FIG. 1 shows a telecommunications network.

As a result of opening the telecommunications market, there are network operators which do not have their own transmission links or switching devices. FIG. 1 shows a telecommunications network 10 whose operator has leased the greater part of the switching and transmission equipment from a conventional network operator and which is therefore referred to below as a new operator. The telecommunications network 10 contains three local switching offices 12 to 16 which are associated with the conventional network operator and are used by the new operator. The network operator of the telecommunications network 10 also has leased transmission links 20 to 26 from the conventional network operator. The transmission link 20 connects the local switching office 12 to a subscriber line concentrator 30 to which a multiplicity of subscribers are connected, two subscribers Tln1 and Tln2 of which are shown in FIG. 1. A telecommunications system 32, which is used by a private company for toll-free switching of connections within the company's premises being also connected to the concentrator 30. The concentrator 30 has also been leased by the conventional network operator. A PCM30 (pulse code modulation) system, for example, is used for transmission on the transmission link 20.

The transmission link 22 connects the local switching office 14 to a subscriber line concentrator 34 to which a multiplicity of subscribers are also connected, subscribers Tln3 and Tln4 of which are illustrated in FIG. 1. A telecommunications system 36 is connected directly to the local switching office 14 via a transmission link 38.

The transmission link 24 lies between the local switching offices 12 and 14. The local switching offices 14 and 16 are connected using the transmission link 26. A telecommunications system 40 is connected to the local switching office 16 via the public telecommunications network 42. Voice data according to the ISDN (Integrated Services Digital Network) standard are transmitted in the public telecommunications network 42.

The network operator of the telecommunications network 10 attempts to utilize the leased transmission links 20 to 26 as well as possible. Compression algorithms for voice are defined, for example, in the standards of the ITU-T (International Telecommunication Union—Telecommunication), for example in the Standards G.723 to G.729. According to the standards, the voice information to be switched within the scope of a normal voice connection can be reduced to bit rates of up to 8 kbit/s on certain links or sections without a disruptive loss of voice quality. This permits a basic channel with a bit rate of 64 kbit/s to be used for transmitting up to eight voice connections. If facsimile data, program data or file data are transmitted over a connection, suitable measures can also be taken to reduce the bandwidth.

The voice quality of a connection depends in particular on the following factors:
  falsification due to voice processing, for example due to voice compression/decompression,
  delays due to transmission, packetizing and/or voice processing,
  echo effects, and
  information losses, for example due to transmission errors or due to losses of packets or cells.

Multiple transcoding leads to audible degradations in the voice quality, for example to:
  voice noise and relatively large voice falsifications,
  reduction in the clarity and comprehensibility,
  the increased difficulty in recognizing the speaker by his voice, and
  listener and speaker echo owing to the relatively long delay times in the transmission of transcoded voice.

Multiple transcodings are therefore to be avoided as much as possible.

However, multiple transcodings occur to an increasing degree due to the following causes:
  connections are switched between different networks,
  the use of reduction methods in private networks, and
  the inclusion of new techniques in voice transmission, for example voice transmission over the Internet.

SUMMARY OF THE INVENTION

It is an aspect of the invention to transmit data with a reduced bandwidth according to a simple method whose use avoids multiple transcodings. In addition, an associated switching device and an associated remote connection unit are provided.

According to an aspect of the invention, a method for transmitting data with a reduced bandwidth, in which the quantity of data to be transmitted over a data transmission network is reduced is provided. The type of reduction is signaled by a source switching device for switching data in the data transmission network to a terminal switching device of the data transmission network. The data processed by the reduction method is transmitted to the terminal switching device. The transmitted data is processed as a function of the signaling using a partner method which is associated with the reduction method and which restores the original data in unchanged form or in an essentially equivalent form.

According to an aspect of the invention, the type of reduction is signaled from a source switching device for switching data in a data transmission network to a terminal switching device of the data transmission network. The data which is processed by the reduction method is transmitted to the terminal switching device. The transmitted data is processed as a function of the signaling using a partner method which is associated with the reduction method and which restores the original data in identical form or an essentially qualitatively equivalent form.

The signaling of the type of reduction to the following switching device in the transmission link ensures that one of a plurality of reduction methods can optionally be used and nevertheless the associated partner method can be determined. In the next switching office, in particular a further reduction with the same method as would be the case for the section-by-section reduction and immediate execution of the partner method at the end of a section, can also be avoided.

According to an aspect of the invention, the partner method is executed only in the terminal switching device. The terminal switching device determines, by reference to the destination of the data to be transmitted, that the partner method is to be executed by the terminal switching device itself. In switching devices upstream of the terminal switching device along the transmission link, it is detected, by reference to the destination call number, that the partner method is not yet to be executed.

According to another aspect of the invention, multiple transcoding with the same reduction method along the transmission link can be avoided. The consequence is an improved transmission quality, in particular an improved voice quality.

The bandwidth of the data to be transmitted is reduced by the use of the reduction method. The transmission capacity of transmission links in the data transmission network and thus the transmission capacity of the data transmission networks can consequently be used very well. In particular, on leased transmission links, the use of the method according to the invention leads to better use of the transmission capacity with a simultaneously high transmission quality. According to another aspect of the invention, the reduction method is carried out in the source switching device. The partner method is carried out in the terminal switching device. The terminals can remain unchanged as a result of this measure.

According to another aspect of the invention, the reduction method used is either a method for demodulating fax data, a method for compressing voice data or a method for handling the TFO (Tandem Free Operation) mode. The selection is carried out automatically. A selection unit monitors the data transmitted on the transmission link and selects a suitable reduction method as a function of the data type. The selection method senses the signal tones of various fax devices and modems. If a device is not detected, the fax data is transmitted without processing by the reduction method. The selection unit also contains devices with which a transmission mode for mobile radio data in a fixed network can be detected, said mode also being known under the name "TandemFree Operation", abbreviated as TFO mode. In this mode, stop data are added to user information data with a bandwidth of 32 kbit/s so that the bandwidth of 64 kbit/s required for transmission in the fixed network is produced. In order to be able to take the TFO mode into account, what is referred to as a TRAU unit Transcoder/Rate Adapter Unit), such as is usually used only at a network gateway between the fixed network and the mobile radio network, is arranged in the selection unit.

According to a further aspect of the invention, the data processed by the reduction method is first transmitted from the source switching device to a transit switching device of the data transmission network. The signaling also initially takes place from the source switching device to the transit switching device, and only then from the transit switching device to the terminal switching device. Stop data is added to the transmitted data in the transit switching device. The data processed using the reduction method is transmitted together with the stop data from the transit switching office to the terminal switching device. While the first transmission section between the source switching device and the transit switching device is effectively utilized in terms of its bandwidth, a higher transmission capacity is required on the second transmission section from the transit switching device to the terminal switching device and is actually necessary. This results in a situation in which it is possible to dispense with transmitting the data with specific modules in multiply used basic channels in the transit switching device. Methods in which there are a plurality of transit switching devices between the source switching device and terminal switching device can also be applied.

According to yet a further aspect of the invention, it is possible to detect, in the switching devices downstream of the source switching devices, that stop data has been added on the basis of the signaling and the transmission bandwidth of the incoming transmission channel. This stop data can be removed in the switching devices which pass through, if corresponding units are present. The following transmission sections can thus again be utilized better in terms of the bandwidth. If appropriate, stop data which is still present is to be removed in the end switching device. Only then is the partner method executed.

In one development, if the switching devices are switching offices in a switched telecommunications network, the signaling takes place inside or outside the transmission channel used for the user information data. The signaling of the type of reduction is carried out in particular using a signaling protocol for the signaling between switching offices. At present, signaling data is increasingly being exchanged between switching offices in accordance with the international signaling protocol No. 7 which was produced by the ITU-T (International Telecommunication Union—Telecommunication Standardization Sector) or its predecessor the CCIT (Comité Consultatif International Télégraphique et Téléphonique). The signaling of the type of reduction can be carried out, for example, by using already defined parameters, not used in the telecommunications network, of the signaling protocol number 7. In particular, the signaling of the type of reduction can advantageously be integrated into protocol-based signaling systems. Signaling which takes place in the user information channel is in principle conceivable but is associated with considerable limitations owing to the restriction on the information which can be signaled.

In another development, transmission links on which the data processed by means of the reduction method are transmitted with a reduced bandwidth are preferably characterized by a network administration center in such a way that these transmission links are known to the controller of a switching device or switching office. The execution of the partner method is in this case also controlled as a function of the prescriptions for the transmission links. This procedure makes it possible to inform a multiplicity of switching offices of the respective transmission links in a simple way.

The switching devices are generally only capable of switching channels with a specific switching bandwidth. For this reason, stop data is added to the data in transmission channels with a smaller bandwidth than the switching bandwidth before the switching operation. This stop data is either removed again immediately after the switching operation, if the user information data is to be transmitted with a reduced bandwidth, or remains with the user information data if it is not necessary to pay attention to the bandwidth during the transmission over the next transmission link.

The invention also relates to switching devices and a remote connection unit for carrying out the method according to the invention and to its developments. In this way, the abovementioned technical effects also apply to the switching device and to the remote connection unit.

The remote connection unit according to the invention is used in the method according to the invention for switching connections with a reduced bandwidth. The remote connection unit is either connected directly to a connection unit in which the method according to the invention or one of its developments is executed, or alternatively the remote connection unit is connected to a connection unit of a switching office which does not carry out the method steps according to the inventive method. However, the switching office contains connection units which execute the method according to the invention or its developments. Connections are switched with double use of a main switching matrix of the switching device both via a connection unit which carries out the method steps according to inventive methods and using a connection unit which does not carry out the inventive method. This measure makes it possible to bundle the connections of a plurality of connection units according to the invention. In addition, switching twice in the switching matrix brings about greater flexibility.

The invention will be explained below with reference to the appended drawings.

DETAILED DESCRIPTION OF THE INVENTION

Figure 2:
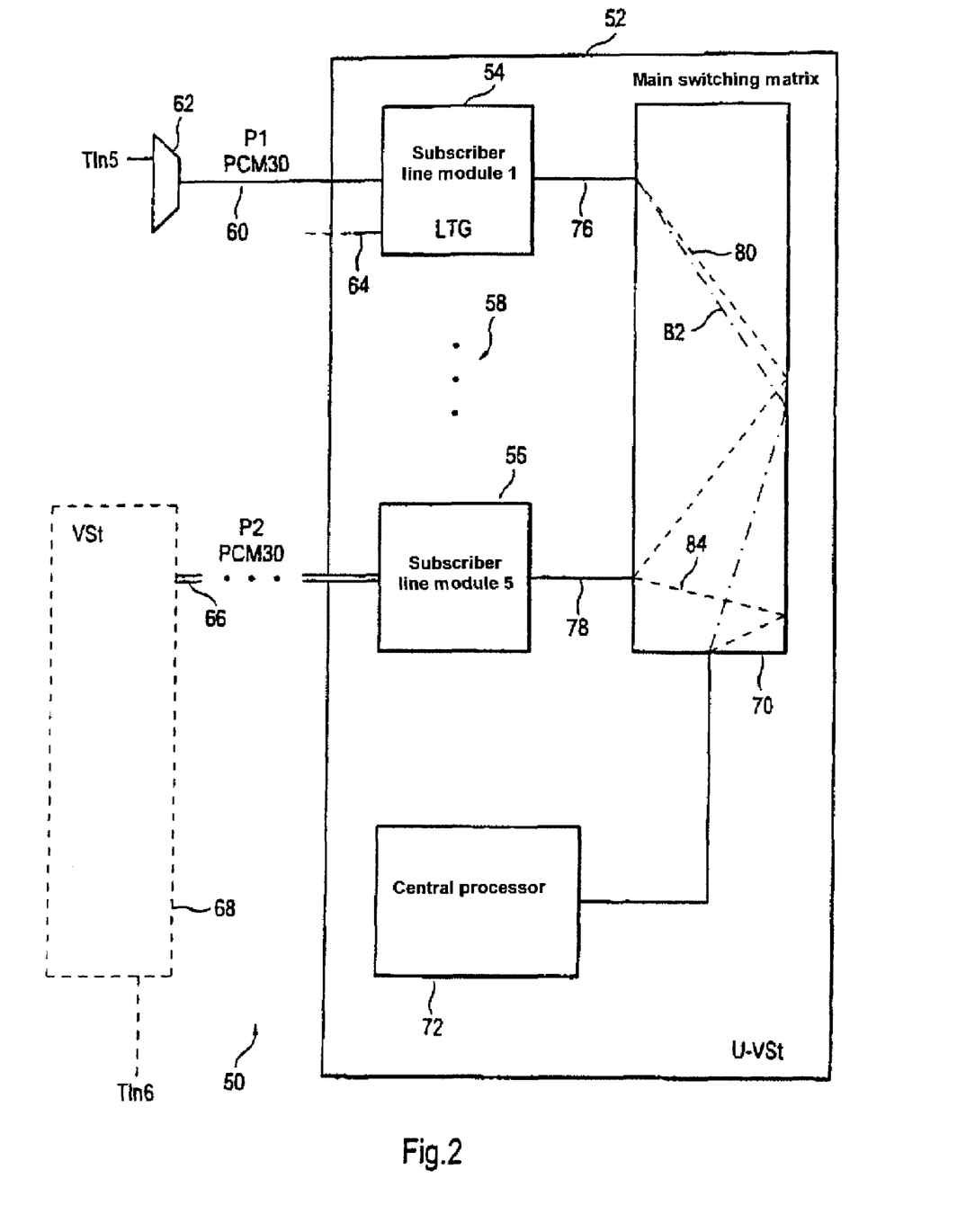
FIG. 2 shows a switching office having a plurality of subscriber line modules.

FIG. 2 shows, in a telecommunications network 50, a switching office 52, also abbreviated to SWO, having a plurality of subscriber line modules 54 and 56. The subscriber line modules are also referred to in English as "line trunk group", abbreviated to LTG. Further subscriber line modules are indicated by points 58.

A connecting line 60 connects the switching office 52 to a concentrator unit 62. Digitized voice data, for example, according to the PCM30 (pulse code modulation) standard are transmitted on the connecting line 60 in 30 basic channels which each have a transmission capacity of 64 kbit/s. The connecting line 60 ends at the subscriber line module 54, which is used to connect lines which come from subscribers, for example from a subscriber Tln5. A further connecting line 64 which is connected to the subscriber line module 54 leads, for example, to a telecommunications system (not illustrated). The subscriber line module 54 is of similar design to the subscriber line module 56, whose design is explained below with reference to FIG. 3.

A connecting line 66 connects the subscriber line module 56 to a switching office 68. Voice data, for example according to the PCM30 standard but in a bandwidth-reduced form, is transmitted on the connecting line 66. The reduction in the bandwidth is represented below by double lines.

The switching office 52 also contains a main switching matrix 70 and a central processor 72. All the subscriber line modules 54 to 56 are connected to the main switching matrix 70 via connecting lines, connecting lines 76 and 78 of which are illustrated in FIG. 2.

Each connecting line 76, 78 has a transmission capacity of, for example, eight Mbit/s so that in each case voice data or control data can be transmitted over 128 transmission channels with a bandwidth of 64 kbit/s. The central processor 72 controls the switching of connections in the switching matrix 70. For example, the central processor 72 switches a voice channel 80 via which a subscriber Tln5 which is connected to the switching office 52 can speak with a subscriber Tln6 connected to the switching office 68. A signaling channel 82 is used by the subscriber line module 54 to transmit control data to the central processor 72 before the connection set-up. After the switching of the connection using the voice channel 80, further control data is exchanged between the subscriber line module 54 and the central processor 72. Control data is exchanged via a signaling channel 84 between the subscriber line module 56 and the central processor 72.

The voice channel 80 and the signaling channels 82, 84 have a transmission capacity of, for example, at least 64 kbit/s if the main switching matrix 70 is only capable of switching connections with such a bandwidth (switching bandwidth).

Figure 3:
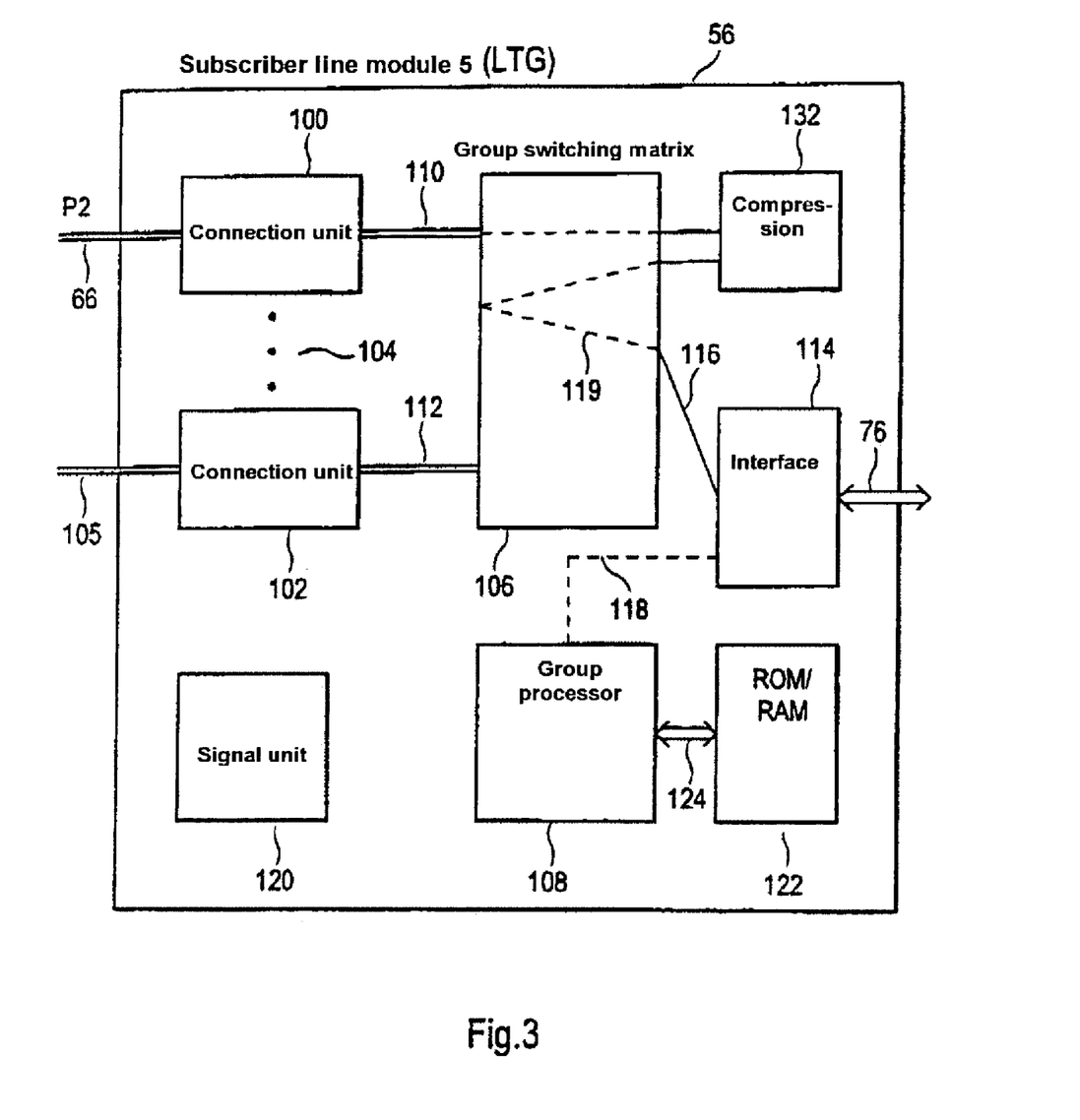
FIG. 3 shows a subscriber line module having a plurality of connection units.

FIG. 3 shows the design of the subscriber line module 56 which contains four connection units, two connection units 100 and 102 of which are illustrated in FIG. 3. Further connection units are indicated by points 104. The connecting line 66 is connected to the connection unit 100. A connecting line 105 on which compressed voice data is transmitted is connected to the connection unit 102, a plurality of user information channels being transmitted in a basic channel with a bandwidth of 64 kbit/s.

The subscriber line module 56 also contains a group switching matrix 106 and a group processor 108. The connection units 100, 102 are connected to the group switching matrix 106 via connecting lines 110, 112 so that connections between the connection units 100, 102 and an interface 114 can be switched in the group switching matrix 106. The interface 114 is connected to the group switching matrix 106 via a connecting line 116 and to the group processor 108 via a connecting line 118. The connecting line 76 is connected to the other side of the interface 114.

The connection illustrated in FIG. 2 for the call between the subscribers Tln5 and Tln6 is switched using a connection 119 in the group switching matrix 106. The connection units 100, 102 are connected to the group processor 108 via a BUS system (not illustrated). The group processor 108 also controls the switching of connections in the group switching matrix 106 via the BUS system.

The subscriber line module 56 contains a signal unit 120 which contains, inter alia, a sound generator, a time pulse generator and a dual tone multi frequency (DTMF) receiver. The signal unit 120 is connected via connections (not illustrated) to the connection units 100, 102, the group switching matrix 106 and to the group processor 58.

In addition, the subscriber line module 54 contains a storage unit 122 which is connected via a BUS 124 to the group processor 108. Programs during whose processing by the group processor 108 the signaling and the connection control are implemented are stored in the storage unit 122.

A compression unit 132 monitors the data switched in the group switching matrix 106 and selects a suitable reduction method as a function of the switched data type. Voice data is compressed. Fax data is demodulated and transmitted with a reduced bandwidth. Data in the TFO mode is also suitably processed.

Figure 4:
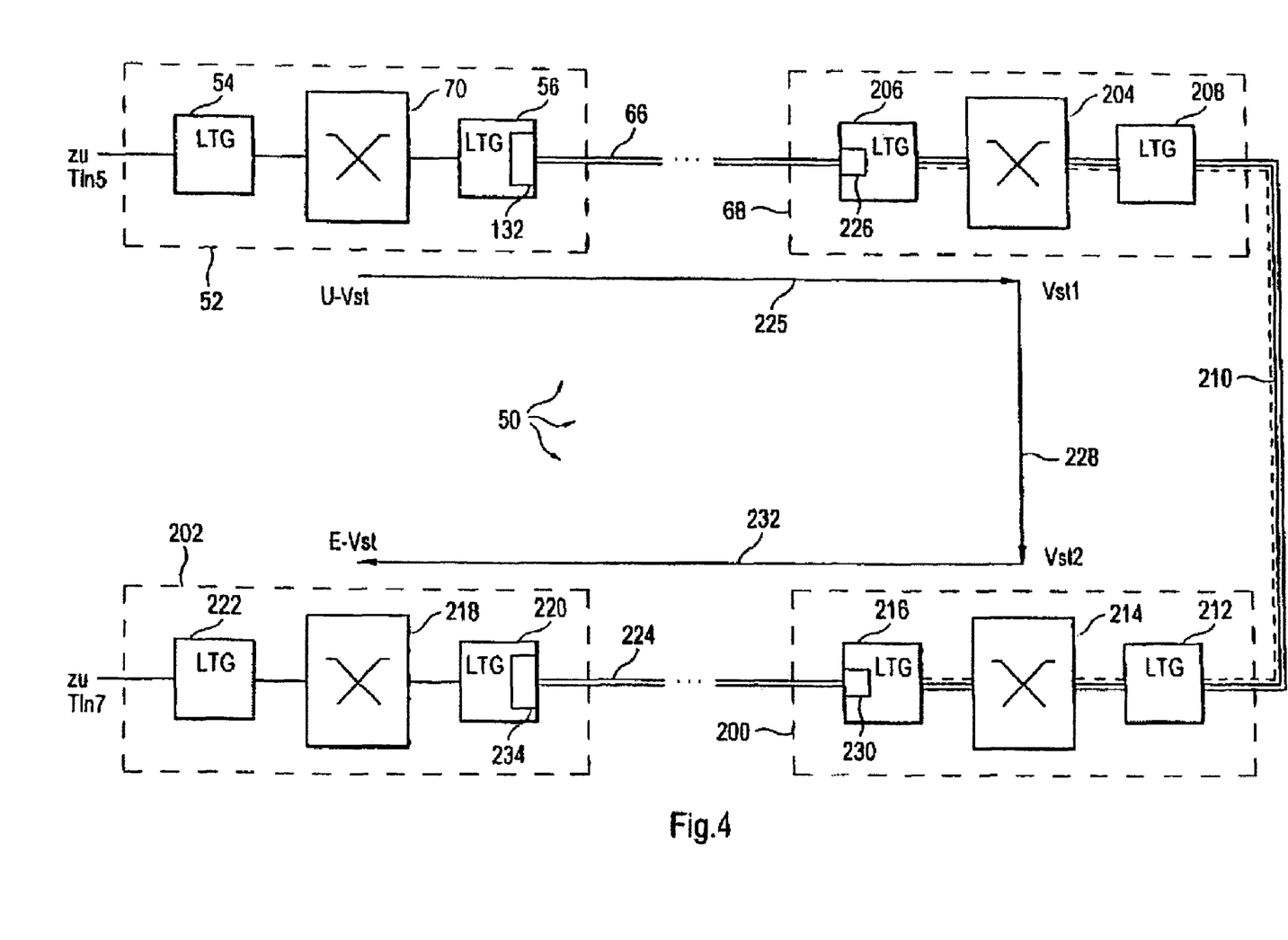
FIG. 4 shows the signaling of the type of reduction and thus also the required transmission capacity between the switching offices.

FIG. 4 shows the signaling of the compression method and, thus, also of the required transmission capacity between the switching offices 52, 68 and switching offices 200, 202. The switching office 68 contains not only a main switching matrix 204 but also a subscriber line module 206 connected to the connecting line 66, as well as a subscriber line module 208. The subscriber line module 208 is connected to a connecting line 210 which leads from the switching office 68 to the switching office 200. In the switching office 200, the connecting line 210 is connected to a subscriber line module 212 which transmits user information data which is incoming on the connecting line 210 to a main switching matrix 214 of the switching office 200. There is also a subscriber line module 216 in the switching office 200.

The switching office 202 contains a main switching matrix 218 and two subscriber line modules 220 and 222. The switching offices 200 and 202 are connected to one another by means of a connecting line 224, one of whose ends is connected to the subscriber line module 216 and the other end of which is connected to the subscriber line module 220.

It will be assumed that the subscriber Tln5 which is connected to the switching office 52 has set up a connection to a subscriber Tln7, which is connected to the switching office 202. The switching office 52 is therefore referred to below as a source switching office. The switching office 202 is referred to as a terminal switching office. The switching offices 68 and 200 are transit switching offices which lie between the source switching office 52 and the terminal switching office 202. The connection between the subscriber Tln5 and Tln7 must be set up via the connecting lines 66 and 224 which have been leased by another network operator. For this reason, the data must be transmitted on the connecting lines 66 and 224 in a compressed form. The user information data is transmitted on the connecting line 210 in compressed form together with stop data in user information channels with a bandwidth of 64 kbit/s. This is represented by two continuous lines which are parallel to one another, and one dashed line parallel thereto.

As explained above with reference to FIG. 3, the subscriber line module 56 contains a compression unit 132. In the transmission direction from the subscriber Tln5 to the subscriber Tln7, the compression unit 132 operates as a voice compression unit, demodulation unit or bandwidth reduction unit, depending on the data to be transmitted. As a result of the compression carried out in the compression unit 132, it is possible to transmit a plurality of user information channels with a transmission bandwidth of, for example, 16 kbit/s each in a basic channel with a transmission capacity of 64 kbit/s on the connecting line 66 to the switching office 68. The connecting line 66 was characterized, from a network maintenance center (not illustrated) in the switching center 52 and in the switching office 68, as a connecting line on which data with a reduced bandwidth is transmitted.

If what is referred to as a transparent connection is requested by the subscriber Tln5, that is to say a connection which is to expressly have a bandwidth of 64 kbit/s, such a connection is also set up in the switching office 52. The compression unit 132 is not used for such connections. If, on the other hand, a voice connection or a 3.1 kHz audio connection is requested, the voice compression and the bandwidth reduction take place in the compression unit 132. The bandwidth reduction takes place either at fixed subrates of 64 kbit/s or in packet-oriented fashion. In the latter case, the channel structure or subchannel structure of the connecting line 66 is generally eliminated. In particular, when silence suppression is applied, the packet-oriented bandwidth reduction is preferred. If the connection temporarily becomes a fax/modem connection, the voice processing in the compression unit 132 is switched off. The signaling data of the fax device or of the modem is switched on. This is possible because the compression unit has control over the fax or modem protocols which are usually used. By demodulating the sound signals coming from the fax device or from the modem, the transmission bandwidth can be reduced if the connected device transmits with a transmission rate which is less than 64 kbit/s.

If the subscriber Tln5 is in a mobile radio network and if the compression unit 132 detects the TFO (Tandem Free Operation) mode of place, stop data which is already added at another place is removed again by the compression unit 132.

If the switching office 52 is a network gateway between the mobile radio network and fixed network, the compression unit 132 prevents stop data from being inserted despite the TFO mode during the transmission in the fixed network. To transmit on the connecting line 66, only one channel with a bandwidth of less than 64 kbit/s is required, for example of 32 kbit/s.

From the source switching office 52, the method which has been carried out for bandwidth reduction in a respective channel by the compression unit 132, cf. arrow 225, is signaled using the signaling protocol to the switching office 68. Signaling is carried out for each logic channel number used on the connecting line 66.

The compressed data transmitted on the connecting line 66 is received in the subscriber line module 206.

Owing to the administrative characterization of the connecting line 66, the data received on the connecting line 66 is already processed. Initially, the data is divided up according to user information channels. Subsequently, stop data is added to the user information data in each user information channel using adaptation units 226 so that a bandwidth of 64 kbit/s is obtained. Then, the user information data and the stop data are switched via the main switching matrix 204 and the subscriber line module 208, as in a known switching office. With packet-oriented bandwidth reduction, a 64 kbit/s channel is used exclusively for switching onward the arriving packets of a specific connection in the switching office 204.

Within the scope of inter-office signaling between the switching offices 52 and 68, the source switching office 52 signals in particular the type of voice compression and thus, inter alia, also the required net bandwidth during the setting up of a connection to the following switching office 68. The transit switching office 68 detects through use of the destination call number that it is a transit switching office and thus that no voice decompression, fax/modem remodulation or processing in terms of the TFO method is necessary. The outgoing connecting line 210 was not administratively characterized as a connecting line on which data with a reduced bandwidth have to be transmitted. For this reason, the stop data is not removed on the output-end subscriber line module 208. The compressed user information data is transmitted to the switching office 200 together with the stop data in 64 kbit/s channels via the connecting line 210.

Within the scope of the inter-office signaling, in addition to the previously used signaling data, the switching office 68 signals onward to the switching office 200 the type of compression and the net bandwidth of the data received by the source switching office 52, cf. arrow 228.

Owing to the forward signaling of the compression type of the connection and the fact that the user information data arrives via an input-end connecting line 210 which is not optimized in terms of bandwidth, the switching office 200 is capable of detecting the content of the 64 kbit/s channel coming from the transit switching office 68 as compressed data with stop data. The output-end connecting line 224 is determined by the destination call number. As already mentioned, the connecting line 224 is characterized as a connecting line on which the data can be transmitted with a reduced bandwidth. As the data is already present in a compressed form, only the stop data is removed from the respective channels in the subscriber line module 216 using an adaptation unit 230.

The switching office 200 signals the type of compression in a respective channel and the associated, actually required transmission bandwidth to the switching office 202, cf. arrow 232. The terminal switching office 202 detects by reference to the destination call number that the subscriber Tln7 is connected within its own subscriber line region. Owing to the forward signaling of the type of compression, the terminal switching office 202 is capable of carrying out, in the input-end subscriber line module 220, a partner method of the method carried out in the subscriber line module 56 for bandwidth reduction. The partner method is carried out in a decompression unit 234 which is located on the subscriber line module 220. Depending on the type of bandwidth reduction, either voice decompression, voice pause generation or fax/modem remodulation is carried out in the decompression unit 234. In this way, the transmitted data is essentially restored to its original form which was present when the data was generated by the subscriber Tln5.

The method explained by reference to FIG. 4 ensures that excess transcodings do not occur in the transit switching offices 68 and 200. Voice data and fax data are transmitted in a way which is optimized in terms of the bandwidths. In addition, codings can be supported in the sense of a tandem-free operation. If the terminal switching office 202 is a network gateway between the fixed network and a network with mobile subscribers, then, in the decompression unit 234, the signal which is received via the connecting line 224 is passed on without being changed to the mobile radio network. Stop data do not have to be removed.

In a similar way to that explained with reference to FIG. 4, the data generated by the subscriber Tln7 is directed via the terminating switching office 202, the transit switching office 200, 68 and the source switching office 52 to the subscriber Tln5. However, a compression unit (not illustrated) which corresponds to the compression unit 132 is used in the subscriber line module 220. Stop data is added in the adaptation unit 230. Stop data is removed in the adaptation unit 226 and the partner method associated with the method for reducing the bandwidth is carried out in a decompression unit, corresponding to the decompression unit 234, of the subscriber line module 56. If the subscriber Tln7 calls the subscriber Tln5, signaling of the type of compression and of the required transmission bandwidth takes place in the direction opposite to the direction illustrated by the arrows 225, 228 and 232.

Figure 5:
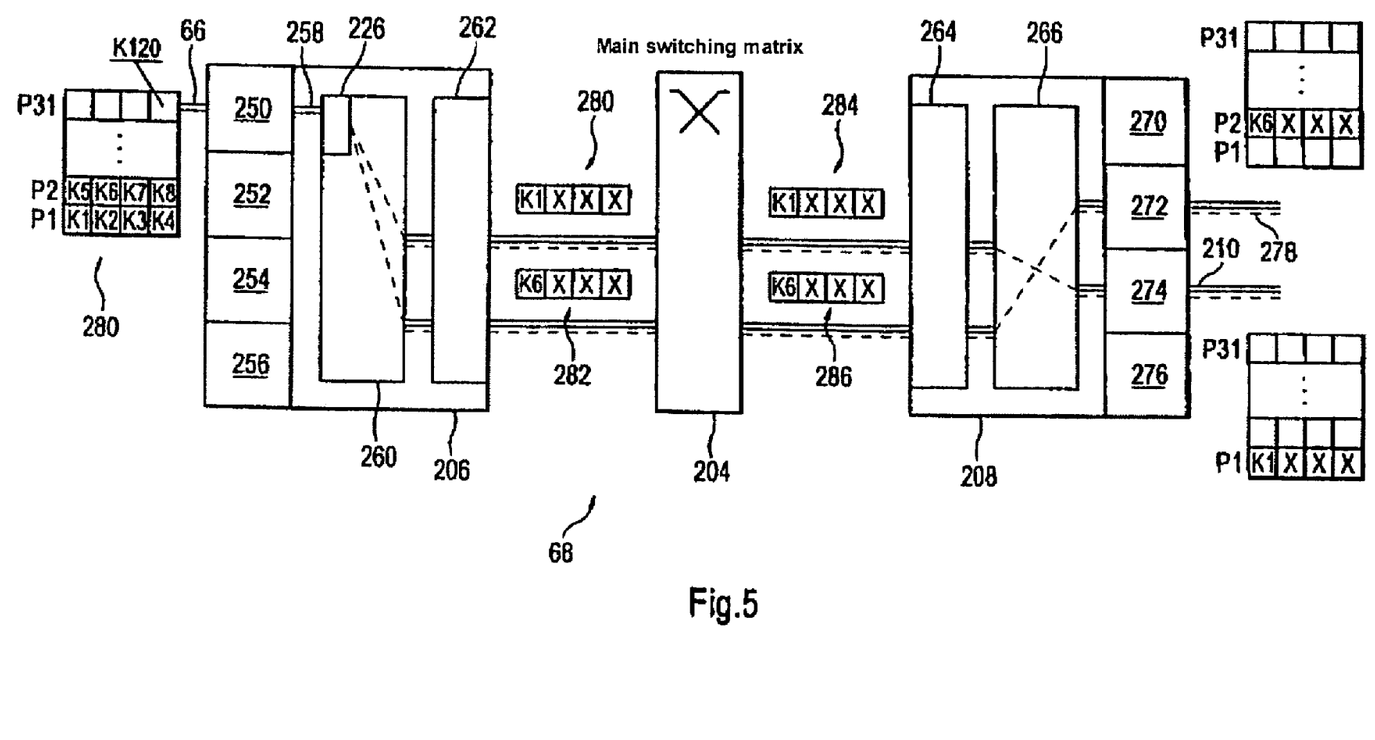
FIG. 5 shows switching processes in a switching office.

FIG. 5 shows switching operations in the switching office 68. The subscriber line module 206 is of similar design to the subscriber line module 56. However, the subscriber line module 206 does not necessarily contain a unit corresponding to the compression unit 132. The subscriber line module 206 contains four connection units 250 to 256 for connecting various connecting lines. The connecting line 66 is connected to the connection unit 250. At the output end, the connection unit 250 is connected via a line 258 to a group switching matrix 260 of the subscriber line module 206. The adaptation unit 226 is located between the connecting line 258 and the group switching matrix 260. In addition, the subscriber line module 206 contains an interface 262 with the main switching matrix 204.

The design of the subscriber line module 208 corresponds essentially to the design of the subscriber line module 206. An interface 264 forms the connection point to the main switching matrix 204. A group switching matrix 266 in the subscriber line module 208 has the same design and the same function as the group switching matrix 260. In addition, the subscriber line module 208 contains four connection units 270 to 276. The connecting line 210 is connected to the connection unit 274. A connecting line 278 is connected to the connection unit 272 and leads to a further switching office (not illustrated).

A channel structure 280 on the connecting line 66 was defined administratively by a network maintenance center. The PCM30 system on the connecting line 66 was divided into logic transmission channels with a transmission rate which is less than 64 kbit/s. The channels with a reduced transmission rate typically have a transmission bandwidth of n×8 kbit/s, n being a natural number greater than 1. In the exemplary embodiment, a reduced bandwidth of 16 kbit/s per user information channel was selected. For this reason, from a logical point of view, there are user information channels K1 to K120 on the PCM30 system 120. In each case, four user information channels are transmitted in a physical channel P1 to P31 with a transmission bandwidth of 64 kbit/s. For example, the four user information channels K1 to K4 are transmitted in the physical PCM channel P1. The physical channel P16 can, in principle, be used for the transmission of signaling data and is not divided here into logic channels with a reduced transmission bandwidth.

During the signaling, the user information channels K1 to K120 are designated by their logic channel number. If a channel is seized on a connecting line which is set up in this way, the transmission rate of the designated channel and its physical position are determined from the logic channel number in the subscriber line module 206.

In the adaptation unit 226, the incoming two bit-long user information data words of the designated channel are written in a predefined fashion into a data word of a 64 kbit/s channel of a PCM frame with a word length of eight bits. Stop data is written into the remaining bit places, for example, by assigning the value zero for the bit places to be filled in. Subsequently, the eight bit-long data words in the switching office 68 are transmitted from the group switching matrix 260 to the main switching matrix 204 via the interface 262. A data word 280 which is generated by the adaptation unit 226 contains voice data of the user information channel K1 in the first two places. The further six places of the data word 280 are filled with stop data X. A data word 282 contains user information data of the user information channel K6 in the first two bit places. The further bit places of the data word 282 are filled with stop data X. In this way, only data words of a bit length of eight bits in channels which are to be switched through with a transmission rate of 64 kbit/s pass from the subscriber line module 206 to the main switching matrix 204.

After the data words 280 and 282 have been switched in the main switching matrix 204, they are transmitted in unchanged form as data words 284 and 286 to the subscriber line module 208 and switched to one of the connection unit 270 to 276 in the group switching matrix 266 on the basis of the destination call number. The data word 284, which corresponds to the data word 280, is switched to the connection unit 274 and transmitted to the switching office 200 in a physical channel P1 with a transmission rate of 64 kbit/s. The data word 286 passes to the connection unit 272 and is transmitted in a physical channel P2 on the connecting line 278 with a transmission rate of 64 kbit/s.

The switching function of the switching office 68 thus remains unchanged in comparison with the function of conventional switching offices. The conversion between the logic channel number and physical position is defined administratively so that the switching functions of the switching office 52 are not affected. The conversion between logic channel number and physical position itself then takes place exclusively in the connection units, for example in the connection unit 250.

Figure 6:
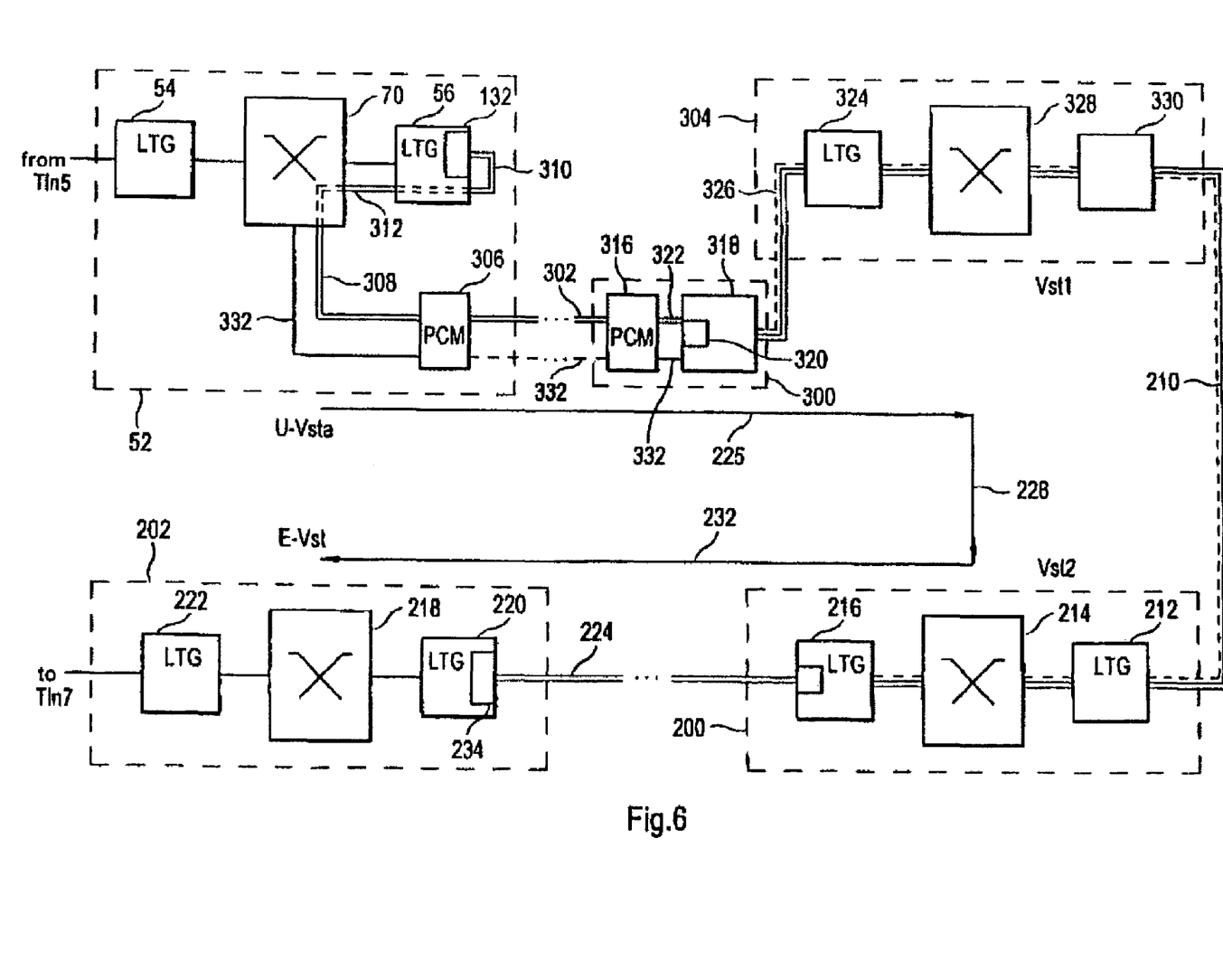
FIG. 6 shows a unit which is remote from a switching office.

FIG. 6 shows a unit 300 which is remote from the switching office 52 and which can be used to carry out the compressed transmission over a connecting line 302, although a following switching office 304 does not have a subscriber line module which is suitable for processing channels with a transmission bandwidth of less than 64 kbit/s. The remote unit 300 is located several kilometers from the switching office 52 and is set up directly in or at the switching office 304. The connecting line 302 corresponds essentially to the connecting line 66 so that there are transmission channels with a transmission rate of, for example, 16 kbit/s on the connecting line 302 as well.

The switching office 52 has already been explained above with reference to FIG. 2 in terms of its design. The subscriber line module 56 and the compression unit 132 were explained above with reference to FIG. 3. In the exemplary embodiment according to FIG. 6, the switching office 52 contains a PCM interface 306 to which the end of the connecting line 302, leading to the switching office 52, is connected. The PCM interface 306 switches basic channels with a transmission bandwidth of 64 kbit/s and is connected to the main switching matrix 70 via a line 308. Each basic channel contains four user information channels. Compressed user information data is transmitted on the line 308 from the main switching matrix 70 to the PCM interface 306.

Instead of the connecting line 66, in the exemplary embodiment according to FIG. 6, a connecting line 310 which leads from the connection unit 100 to a directly adjacent connection unit of the subscriber line module 56 is connected to the subscriber line module 56. Via the connecting line 310, the user information data coming from the connection unit 100 passes in compressed form up to the connecting line 308 via the group switching matrix 106, a transmission link 312 and a transmission channel 314 switched in the switching matrix 70.

The remote unit 300 contains a PCM interface 316 which is connected to the end, leading to the remote unit 300, of the connecting line 302. In addition, the remote unit 300 contains a subscriber line module 318 whose design corresponds essentially to the design of the subscriber line module 206 explained above with reference to FIG. 5. An adaptation unit 320 fulfills the function of the adaptation unit 226. The subscriber line module 318 generally contains a compression unit/decompression unit. In the exemplary embodiment according to FIG. 6, this unit is however not used. A connecting line 322 connects the PCM interface 300 to the subscriber line module 318. A connecting line 326 several meters long connecting line lies between the subscriber line module 318 and a subscriber line module 324. The subscriber line module 324 is a conventional subscriber line module in the switching office 304. In addition to a main switching matrix 328, a further subscriber line module 330 of the switching office 304 is also illustrated in FIG. 6. The subscriber line module 330 is connected to the connecting line 210 which leads to the switching office 200.

A control channel 332 leads from the switching office 52 via the connecting line 302 up to the subscriber line module 318. Using the control channel 332, the channels on which user information data is transmitted with a reduced bandwidth can be characterized in the subscriber line module 318. Data passes in user information channels with a transmission rate of 16 kbit/s via the connecting line 302 to the PCM interface 316 and from there to the adaptation unit 320, also with a transmission rate of 16 kbit/s. In the adaptation unit 320, the user information data items of various user information channels are separated from one another and replaced by stop data so that the further transmission via the connecting line 326 to the subscriber line module 324 can take place with a transmission rate of 64 kbit/s per user information channel. If appropriate, the user information data is handled by the partner method which is available in the compression unit, as a result of which a bandwidth of 64 kbit/s is also produced. In the switching office 304, decompressed user information data is switched, or user information data is switched together with the stop data, and said data passes via the connecting line 210 to the switching office 200 and from there to the switching office 202. The method steps explained above with reference to FIG. 4 are executed in the switching office 202.

Signaling of the type of compression in the switching office 52 is maintained, as also explained above with reference to FIG. 4, cf. arrows 225, 228 and 232.

The invention claimed is:

1. A method for transmitting data with a reduced bandwidth in which a quantity of data to be transmitted over a data transmission network is reduced according to a reduction method, comprising:

signaling the types of reduction method as a function of the switched data type from a source switching device for switching data in the data transmission network to a terminal switching device of the data transmission network;

transmitting the data processed by the reduction method to the terminal switching device; and processing the transmitted at the terminal switching device data as a function of the signaling using a partner method which is associated with the reduction method and which restores the transmitted data in original form as before reduction or in essentially qualitatively equivalent form.

2. The method as claimed in claim 1, wherein the reduction method is carried out in the source switching device, and/or the partner method is carried out in the terminal switching device.

3. The method as claimed claim 1, wherein the reduction method is a method for demodulating fax data, and the partner method is a method for remodulating fax data, and/or the reduction method is a method for compressing voice data, and the partner method is a method for decompressing voice data, and/or the reduction method is a method for removing or for suppressing insertion of stop data, and the partner method is a method for inserting stop data or for passing on the unchanged data of the data to be transmitted.

4. The method as claimed in claim 1, wherein the data which is processed by the reduction method is initially transmitted from the source switching device to a transit switching device, the signaling is initially carried out from the source switching device to the transit switching device and then from the transit switching device to the terminal switching device, in the transit switching device, stop data is added to the data to be transmitted, and the data is transmitted together with the stop data to a next switching device.

5. The method as claimed in claim 1, wherein the switching device is a switching office in a switched telecommunications network, and a standardized protocol is used for signaling between switching offices.

6. The method as claimed in claim 1, wherein a network maintenance center is configured to determine which transmission links the data processed by the reduction method is transmitted with a reduced bandwidth, and the execution of the partner method is controlled as a function of determinations made by the network maintenance center regarding the transmission links.

7. The method as claimed in claim 1, wherein in order to switch the data processed by the reduction method, stop data is added to said data in at least one switching device.

8. A switching device for transmitting data with a reduced bandwidth, comprising:
   a switching matrix for switching transmission channels of a switching bandwidth;
   a connection unit for connecting transmission links in which data is transmitted in basic channels with the switching bandwidth; and
   a control unit for controlling the switching and signaling processes for setting up and/or releasing connections, wherein
   at least two methods for reducing the quantity of the data to be transmitted can be executed in the switching device,
   at least two user information channels with data processed by the reduction method are transmitted in a basic channel, and
   the control unit is set up in such a way that the type of reduction method as a function of the switched data type is signaled to the next switching device in a transmission route of the data to be transmitted.

9. A switching device for transmitting data with a reduced bandwidth, comprising:
   a switching matrix for switching transmission channels of a switching bandwidth;
   a connection unit for connecting transmission links in which data is transmitted in basic channels with the switching bandwidth; and
   a control unit for controlling the switching and signaling processes for setting up and/or releasing connections, wherein
   in the switching device, at least two partner methods of reduction methods can be executed,
   at least two user information channels with data whose bandwidth is reduced by the reduction method are transmitted in a basic channel,
   the control unit is set up in such a way that signaling data which is transmitted by a preceding switching device and which relates to the type of reduction method is evaluated, and
   the partner method associated with the reduction method is executed as a function of a phone number or parts thereof.

* * * * *